US012492757B2

(12) United States Patent
Smith et al.

(10) Patent No.: US 12,492,757 B2
(45) Date of Patent: Dec. 9, 2025

(54) SMART VALVE GAS SHUT-OFF SYSTEM

(71) Applicant: Georg Fischer Central Plastics LLC, Shawnee, OK (US)

(72) Inventors: Michael D. Smith, Shawnee, OK (US); Tom Veeley, Shawnee, OK (US)

(73) Assignee: GEORG FISCHER CENTRAL PLASTICS LLC, Shawnee, OK (US)

( * ) Notice: Subject to any disclaimer, the term of this patent is extended or adjusted under 35 U.S.C. 154(b) by 114 days.

(21) Appl. No.: 18/534,108

(22) Filed: Dec. 8, 2023

(65) Prior Publication Data
US 2025/0189051 A1   Jun. 12, 2025

(51) Int. Cl.
F16K 17/00 (2006.01)
F16K 17/36 (2006.01)
F16K 31/02 (2006.01)

(52) U.S. Cl.
CPC .............. F16K 17/00 (2013.01); F16K 17/36 (2013.01); F16K 31/02 (2013.01)

(58) Field of Classification Search
USPC ............. 251/129.04; 454/256, 257; 137/78.1
See application file for complete search history.

(56) References Cited

U.S. PATENT DOCUMENTS

| | | | | |
|---|---|---|---|---|
| 4,797,664 A * | 1/1989 | Kimura | .............. | G01N 33/0062 340/584 |
| 5,654,505 A * | 8/1997 | Jiles | .............. | G01F 15/185 73/201 |
| 5,742,516 A * | 4/1998 | Olcerst | .............. | F24F 11/0001 436/138 |
| 6,086,331 A * | 7/2000 | Halkjær | .............. | F04D 15/0077 417/372 |
| 6,766,835 B1 * | 7/2004 | Fima | .............. | F24H 15/31 219/490 |
| 6,892,751 B2 * | 5/2005 | Sanders | .............. | E03B 7/071 307/118 |
| 7,042,352 B2 | 5/2006 | Kates | | |
| 7,102,504 B2 | 9/2006 | Kates | | |
| 7,102,505 B2 | 9/2006 | Kates | | |
| 7,142,107 B2 | 11/2006 | Kates | | |
| 7,210,495 B1 * | 5/2007 | Olson | .............. | F17D 5/06 137/561 A |
| 7,218,237 B2 | 5/2007 | Kates | | |
| 7,411,494 B2 | 8/2008 | Kates | | |
| 7,561,057 B2 | 7/2009 | Kates | | |
| 7,583,198 B2 | 9/2009 | Kates | | |
| 7,623,028 B2 | 11/2009 | Kates | | |
| 7,817,031 B2 | 10/2010 | Kates | | |
| 7,893,812 B2 | 2/2011 | Kates | | |
| 7,893,827 B2 | 2/2011 | Kates | | |
| 7,893,828 B2 | 2/2011 | Kates | | |
| 7,936,264 B2 | 5/2011 | Kates | | |

(Continued)

Primary Examiner — Matthew W Jellett
(74) Attorney, Agent, or Firm — Banner & Witcoff, Ltd.

(57) ABSTRACT

A smart valve gas shut-off system for use in a building to detect the presence of natural gas and to shut off the supply of gas leading to the appliance from where the gas was detected. The smart valve gas shut-off system uses a sensor to detect the natural gas and a sensor alarm, in the form of a light indicator or other indicator, that while the sensor is in the alarm state, the valve controlling the supply of gas to the appliance is disabled as well as the reset button, meaning the valve that controls the flow of gas cannot be opened.

20 Claims, 3 Drawing Sheets

(56) References Cited

U.S. PATENT DOCUMENTS

| | | | |
|---|---|---|---|
| 7,950,622 B2* | 5/2011 | Evers | F16K 31/06 |
| | | | 251/129.01 |
| 7,982,602 B2 | 7/2011 | Kates | |
| 8,031,079 B2 | 10/2011 | Kates | |
| 8,188,873 B2* | 5/2012 | Barth | G08B 21/20 |
| | | | 73/40 |
| 8,251,085 B2* | 8/2012 | Goodson | F17D 5/08 |
| | | | 137/554 |
| 8,638,215 B2 | 1/2014 | Kates | |
| 8,857,466 B1* | 10/2014 | Wilson | E03B 7/071 |
| | | | 137/551 |
| 8,905,058 B2* | 12/2014 | Goodson | F17D 5/08 |
| | | | 324/72 |
| 8,963,726 B2 | 2/2015 | Kates | |
| 8,963,727 B2 | 2/2015 | Kates | |
| 8,963,728 B2 | 2/2015 | Kates | |
| 8,981,950 B1 | 3/2015 | Kates | |
| 9,007,225 B2 | 4/2015 | Kates | |
| 9,019,110 B2 | 4/2015 | Kates | |
| 9,183,733 B2 | 11/2015 | Kates | |
| 9,286,787 B2 | 3/2016 | Kates | |
| 9,286,788 B2 | 3/2016 | Kates | |
| 9,318,015 B2 | 4/2016 | Kates | |
| 9,357,490 B2 | 5/2016 | Kates | |
| 9,412,260 B2 | 8/2016 | Kates | |
| 9,474,023 B1 | 10/2016 | Kates | |
| 9,723,559 B2 | 8/2017 | Kates | |
| 9,860,839 B2 | 1/2018 | Kates | |
| 9,872,249 B2 | 1/2018 | Kates | |
| 9,928,720 B2 | 3/2018 | Cornwall | |
| 9,955,423 B2 | 4/2018 | Kates | |
| 10,015,743 B2 | 7/2018 | Kates | |
| 10,203,049 B2* | 2/2019 | Kucera | G05D 7/0635 |
| 10,229,586 B2 | 3/2019 | Kates | |
| 10,395,513 B2 | 8/2019 | Kates | |
| 10,515,530 B2 | 12/2019 | Cornwall | |
| 10,565,858 B2 | 2/2020 | Kates | |
| 10,573,166 B2 | 2/2020 | Kates | |
| 10,663,443 B2 | 5/2020 | Kates | |
| 10,861,316 B2 | 12/2020 | Kates | |
| 11,222,517 B2 | 1/2022 | Corcoran | |
| 2005/0262923 A1* | 12/2005 | Kates | F24F 11/30 |
| | | | 73/29.01 |
| 2005/0275527 A1* | 12/2005 | Kates | G08B 1/08 |
| | | | 340/539.22 |
| 2005/0275528 A1* | 12/2005 | Kates | G08B 25/009 |
| | | | 340/539.22 |
| 2005/0275529 A1* | 12/2005 | Kates | G08B 1/08 |
| | | | 340/539.22 |
| 2005/0275530 A1* | 12/2005 | Kates | G08B 1/08 |
| | | | 340/539.22 |
| 2005/0275547 A1* | 12/2005 | Kates | G08B 21/182 |
| | | | 340/522 |
| 2006/0007008 A1* | 1/2006 | Kates | G01M 3/002 |
| | | | 340/618 |
| 2006/0267756 A1* | 11/2006 | Kates | G08B 21/182 |
| | | | 340/521 |
| 2007/0090946 A1* | 4/2007 | Kates | H04Q 9/00 |
| | | | 340/539.22 |
| 2007/0211076 A1* | 9/2007 | Kates | G08B 21/20 |
| | | | 345/605 |
| 2008/0278310 A1* | 11/2008 | Kates | H04Q 9/00 |
| | | | 340/539.1 |
| 2008/0278315 A1* | 11/2008 | Kates | G08B 17/10 |
| | | | 340/539.17 |
| 2008/0278316 A1* | 11/2008 | Kates | G08B 25/007 |
| | | | 340/539.22 |
| 2008/0278342 A1* | 11/2008 | Kates | G08B 1/08 |
| | | | 340/13.24 |
| 2008/0284590 A1* | 11/2008 | Kates | G08B 1/08 |
| | | | 340/539.22 |
| 2008/0303654 A1* | 12/2008 | Kates | H04W 52/0225 |
| | | | 340/539.3 |
| 2010/0188206 A1* | 7/2010 | Kates | G08B 21/20 |
| | | | 340/521 |
| 2010/0271217 A1* | 10/2010 | Kates | G08B 17/10 |
| | | | 340/604 |
| 2011/0025501 A1* | 2/2011 | Kates | G08B 25/001 |
| | | | 340/540 |
| 2012/0019388 A1* | 1/2012 | Kates | G08B 19/00 |
| | | | 340/605 |
| 2014/0203935 A1* | 7/2014 | Kates | G08B 21/182 |
| | | | 340/540 |
| 2014/0203943 A1* | 7/2014 | Kates | H04W 52/0225 |
| | | | 340/628 |
| 2014/0285336 A1* | 9/2014 | Kates | G08B 25/001 |
| | | | 340/501 |
| 2014/0320295 A1* | 10/2014 | Kates | F24F 11/30 |
| | | | 340/628 |
| 2014/0333423 A1* | 11/2014 | Kates | H04W 52/0225 |
| | | | 340/309.16 |
| 2014/0333434 A1* | 11/2014 | Kates | G08B 25/10 |
| | | | 340/539.22 |
| 2014/0333445 A1* | 11/2014 | Kates | G08B 25/007 |
| | | | 340/628 |
| 2015/0011169 A1* | 1/2015 | Kates | G01N 33/0075 |
| | | | 455/73 |
| 2015/0061868 A1* | 3/2015 | Kates | G06D 1/3209 |
| | | | 340/539.22 |
| 2015/0061877 A1* | 3/2015 | Kates | H04B 1/69 |
| | | | 340/628 |
| 2015/0061878 A1* | 3/2015 | Kates | G08B 17/10 |
| | | | 340/628 |
| 2015/0061892 A1* | 3/2015 | Kates | G08B 1/08 |
| | | | 340/870.16 |
| 2015/0065030 A1* | 3/2015 | Kates | G01N 33/0065 |
| | | | 454/256 |
| 2015/0070192 A1* | 3/2015 | Kates | G08B 21/14 |
| | | | 340/870.39 |
| 2015/0247584 A1* | 9/2015 | Singley | F16K 31/06 |
| | | | 251/69 |
| 2016/0029315 A1* | 1/2016 | Kates | G08B 25/001 |
| | | | 340/602 |
| 2016/0247382 A1* | 8/2016 | Kates | G08B 25/10 |
| 2016/0267761 A1* | 9/2016 | Kates | G06F 1/3209 |
| 2016/0286490 A1* | 9/2016 | Kates | G08B 25/009 |
| 2017/0193790 A1* | 7/2017 | Cornwall | G01D 21/00 |
| 2017/0257826 A1* | 9/2017 | Kates | G08B 25/009 |
| 2018/0098283 A1* | 4/2018 | Kates | G06F 1/3209 |
| 2018/0110006 A1* | 4/2018 | Kates | H04Q 9/00 |
| 2018/0115951 A1* | 4/2018 | Kates | H04Q 9/02 |
| 2018/0182225 A1* | 6/2018 | Cornwall | G01M 3/00 |
| 2018/0262985 A1* | 9/2018 | Kates | G06F 1/3209 |
| 2018/0262986 A1* | 9/2018 | Kates | G08B 25/009 |
| 2018/0262987 A1* | 9/2018 | Kates | G08B 1/08 |
| 2020/0286351 A1* | 9/2020 | Corcoran | H04L 12/825 |

* cited by examiner

SMART VALVE GAS SHUT-OFF SYSTEM

FIELD

Aspects of this invention relate generally to the detection of natural gas in a building, and, in particular, to a natural gas detection and shut-off system that may be used in and around the area of an appliance or anywhere else within a building where there is the potential of a gas leak.

BACKGROUND

Gas in the form of natural gas can be harmful when detected in a building, such as a house, due to its potential to cause fires and explosions. Natural gas is highly flammable and can ignite with just a small spark or open flame. If there is a gas leak in a house from an appliance or gas line, the gas can accumulate in enclosed spaces, increasing the risk of an explosion. In addition to the immediate danger of fire and explosion, natural gas can also displace oxygen in the air, leading to asphyxiation if the gas concentration becomes too high.

Inhaling natural gas can also cause health issues, such as headaches, dizziness, nausea, and respiratory problems. Additionally, natural gas is composed mainly of methane, which is a potent greenhouse gas and can therefore have an impact on the environment. Consequently, it is important to promptly detect and control any natural gas leaks in a house to ensure the safety of occupants and minimize the environmental impact.

It would be desirable, therefore, to provide a gas detection system that can be readily installed within a building, such as a house, and that can prevent the negative consequences of a natural gas leak within the building. The present invention and the instant disclosure provides such a solution by providing a smart valve gas shut-off system that will: 1) immediately shut off the supply of natural gas to one, two or all appliances within a building; and 2) control when the supply of natural gas may be resumed to each of the appliances. Other beneficial features associated with the smart valve gas shut-off system are disclosed herein.

Particular objects and advantages will be apparent to those skilled in the art, that is, those who are knowledgeable or experienced in this field of technology, in view of the following disclosure of the invention and detailed description of certain embodiments.

SUMMARY

Aspects of the present invention may be used to advantageously provide a smart valve gas shut-off system that will shut off the supply of natural gas to one, two or all appliances within a building or structure and will control when the supply of gas may be resumed to each of the appliances.

In accordance with a general aspect of the disclosure, a smart valve gas shut-off system that controls the supply of natural gas to one or more appliances is disclosed. The smart valve gas shut-off system uses sensors to detect the presence of gas in the vicinity and then communicates with a valve to shut off the gas leading to the appliance in the area from where the gas was detected. In one aspect, the smart valve gas shut-off system also uses a sensor alarm, in the form of a light indicator or other indicator, such as an audio alarm. While the sensor is in the alarm state, meaning that natural gas is being detected, the valve reset button for the gas valve is disabled and so the valve that controls the flow of natural gas cannot be opened. Once the sensor returns to a normal state, and gas is no longer detected, the valve rest button is enabled and the gas valve can then be manually reopened. Once reopened, the gas will re-flow to the appliance, and the appliance may be relit, if desired.

In a further aspect of the disclosure, if two or more sensors detect the presence of gas within a room or building, a full system alarm is set off and all gas valves for all appliances are shut off. In one embodiment, this may further include shutting off the main valve that controls the supply of gas to the building. Light indicators, or other indicators such as audio alarms, will trigger indicating the presence of gas and therefore provide an alarm. In the alarm state, all valve reset buttons on all gas valves are disabled, meaning all valves within the building, and that separately control the flow of gas, cannot be opened. Once all the sensors return to a normal state and no gas is detected, all valve reset buttons are enabled which will allow all gas valves to be manually reopened. Once reopened, the gas will re-flow to each appliance, and the appliances may be relit, if desired.

From the instant disclosure, it will be readily apparent to those skilled in the art, that is, those who are knowledgeable or experienced in this area of technology, that embodiments of a smart valve gas shut-off system disclosed herein may provide a significant technological advance over prior attempts to provide a gas detection system. These and additional features and advantages will be further understood from the following detailed disclosure of certain embodiments.

Figure 1:
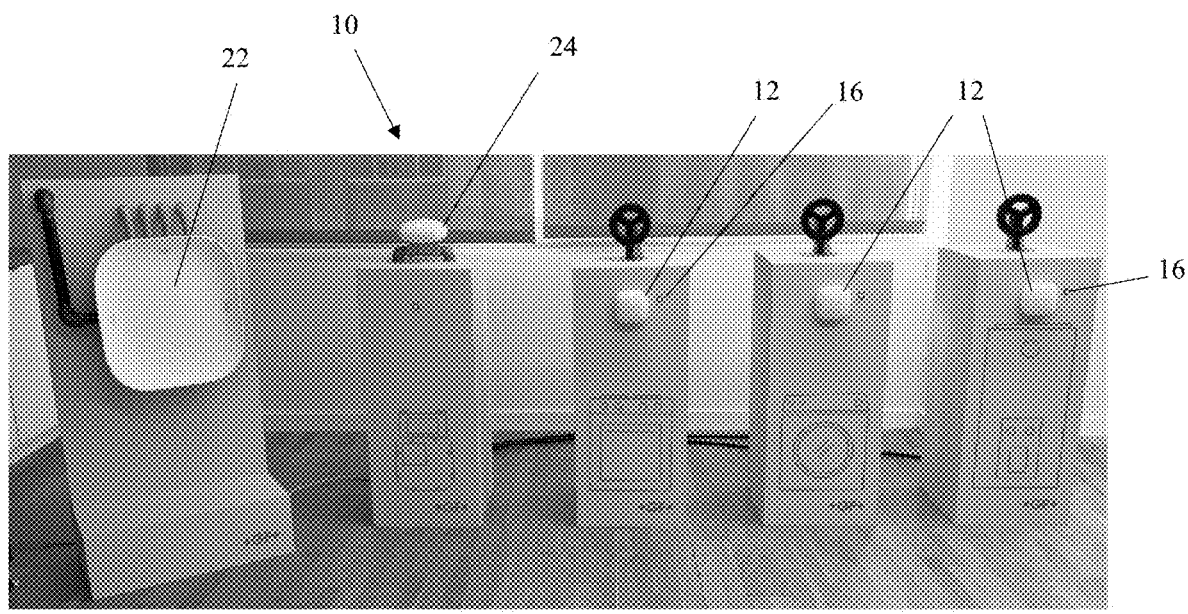
FIG. 1 is a front view of the smart valve gas shut-off system according to aspects of the disclosure.

The figures referred to above are not drawn necessarily to scale and should be understood to provide a representation of a smart valve gas shut-off system, illustrative of the principles involved. Some features of the smart valve gas shut-off system depicted in the drawings have been enlarged or distorted relative to others to facilitate explanation and understanding. The same reference numbers are used in the drawings for similar or identical components and features shown in various alternative embodiments. The smart valve gas shut-off system as disclosed herein may have configurations and components determined, in part, by the intended application and environment in which they are used.

DETAILED DESCRIPTION OF THE EMBODIMENTS

The present invention may be embodied in various forms. An exemplary embodiment of a smart valve gas shut-off system is shown in the figures. For convenience, terms such as upper, lower, top, bottom, front, and rear may be used herein to differentiate between the upper and lower ends and front and rear sides of particular components of the smart valve gas shut-off system. It is to be appreciated that such terms are used only for ease of description and understanding and that they are not intended to limit the possible spatial orientations of the smart valve gas shut-off system or its components during assembly or use.

The term "substantially," as used herein, is meant to mean mostly, or almost the same as, within the constraints of sensible commercial engineering objectives, costs, manufacturing tolerances, and capabilities in the field of gas shut-off systems and use. Similarly, the term "approximately" as used herein is meant to mean close to, or about a particular value, within the constraints of sensible commercial engineering objectives, costs, manufacturing tolerances, and capabilities in the field of gas shut-off system and use.

Referring to FIG. 1, in an exemplary embodiment, a smart valve gas shut-off system 10 may include one or more sensors 12 designed to detect the presence of natural gas. As will be understood, natural gas is a general term used to describe a fossil fuel energy source. Natural gas contains many different compounds, with the largest component being methane. Natural gas also contains smaller amounts of hydrocarbon gas liquids and nonhydrocarbon gases, such as carbon monoxide and water vapor. Methane, the largest component, is colorless and odorless. Natural gas is highly flammable and can readily ignite with just a small spark or flame. And in enclosed spaces, natural gas can accumulate further increasing the risk of an explosion. Natural gas can also displace oxygen in the air, leading to asphyxiation if the gas concentration becomes too high, and can create health issues for people exposed to natural gas. Detection and control of natural gas is therefore vital. The smart valve gas shut-off system 10 provides such a vital, improved detection and control of natural gas supplied to a building, such as a house, as explained herein.

It should be understood that the teachings and principles of the embodiments of the instant disclosure may be readily applied to the detection and control of not only natural gas, which includes methane gas, but of other materials, such as carbon monoxide, smoke, radon, propane, hydrogen, and so forth. The embodiments of the instant disclosure and the use thereof for the detection of natural gas are therefore merely exemplary of all the possible uses of the invention.

Figure 2:
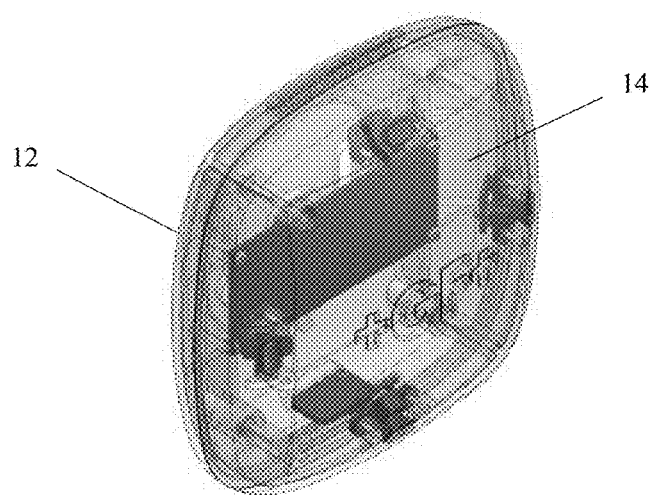
FIG. 2 is an isometric and partially transparent view of an exemplary sensor used with the smart valve gas shut-off system of FIG. 1.

In an aspect, and referring to FIG. 2, the sensor 12 may define a sensor body 14 in which may be housed a natural gas detector. The natural gas detector may be any known ambient sensor that is configured to detect natural gas. The natural gas detector may also be any other known sensor or detection technique that can sense the presence of natural gas. The sensor body 14 may define any number of shapes, including the depicted square configuration with rounded corners. The sensor 12 may be located at any desirable location within a building. In an exemplary aspect, the sensor 12 may be located in or around the area where there is located an appliance that uses natural gas as its energy source. In an aspect, the sensor 12 should be located in every room of a building where a natural gas appliance is present. In one aspect, the sensor 12 may be set to detect gas levels at any level or levels above a certain threshold.

The sensor 12 may include not only a natural gas detector, but also hardware, control circuitry, and transceivers to achieve the communications and control of the system. After the natural gas detector housed within the sensor body 14 detects the presence of natural gas, these other components facilitate the control of the system by providing a signal wirelessly to one or more gas shut-off valves or to a control panel located within the building, as described herein. The components also allow the sensor to provide an alert signal such as a light indicator or audio alarm, as also described herein.

The physical location of the sensor 12 may be on a nearby wall, on the floor, or on the ceiling in a room. The sensor 12 may also be located on the appliance or on another structure nearby the appliance. Exemplary appliances on which the sensor may be mounted to may include washers, dryers, hot water heaters, stoves, ovens, furnaces, and any other appliance that runs on natural gas. The sensor 12 may also be mounted near or around the main valve that supplies natural gas to the building. The sensor 12 may be mounted to these locations using any known mounting technique, including the use of fasteners and mounting brackets.

In another aspect, the sensor 12 may be operatively coupled to a light indicator 16, as illustrated in FIG. 1. The operative coupling may be through a wired connection between the sensor and light indicator, or it may be wirelessly. The light indicator may be separate from the sensor 12 or may be incorporated with or mounted to the sensor 12. In an aspect, the light indicator 16 may be located remote from the sensor 12.

The light indicator 16 may define any color of light and may include the ability to create a changing light color or a flashing light. The light indicator may be more than one light, or it may be an array of lights.

The light indicator 16 may be used as an alarm to warn occupants that natural gas has been detected by the sensor 12. That is, upon detecting the presence of natural gas, the sensor 12 communicates with the light indicator 16 causing it to turn on or change colors. Once turned on or changed colors, the light emanating from the light indicator is the warning signal that natural gas has been detected. In one aspect, the sensor may communicate with the light indicator to change the color from white to red, for example, where red indicates the detection of natural gas by the sensor 12. Other color changes may be used with the light indicator.

In an aspect, the light from the light indicator 16 may be a solid light, or may be a flashing or strobe light. The light may vary in intensity, as desired. The light may change colors, as indicated.

In an alternative aspect, the light indicator may be coupled with, used with, or replaced by an audio alarm. Upon detection of the natural gas by the sensor 12, the sensor may communicate with the audio alarm which will provide an audio sound that functions as an alert that natural gas was detected by the sensor 12. In yet further aspects, the light indicator may be substituted with or used in conjunction with other techniques to provide an alert as to the presence of natural gas.

In another aspect, a shut-off valve 18 may be operatively coupled to a natural gas supply line that supplies gas to the building. The shut-off valve may also be operatively coupled to one or more appliances located within the building. In an aspect, the shut-off valve 18 may be operatively coupled to the natural gas line running to each appliance within the building.

The shut-off valve may be a solenoid valve that is capable of opening or closing the supply line to either allow or block natural gas from passing through the valve. The solenoid valve may be controllable by the sensor vis a vis a signal that is sent from the sensor to the solenoid valve to operatively control the closing and opening of the valve. As understood, the solenoid valve is an electrically controlled valve. The valve features a solenoid, which is an electric coil with a movable ferromagnetic plunger in its center. In the closed position, the plunger closes off the orifice and no gas can flow through the valve. By providing an electric current through the coil will create a magnetic field that exerts an upwards force on the plunger to thereby lift the plunger away from the orifice to open the orifice and to allow gas to pass through the valve. The solenoid valve may include a reset button or control feature that prevents the operation of the solenoid valve and that also allows the solenoid valve to be operable upon activation of the reset button. Once operable, the solenoid valve can be operated to move the plunger away from the orifice to thereby allow gas to reflow through the valve.

Figure 3:
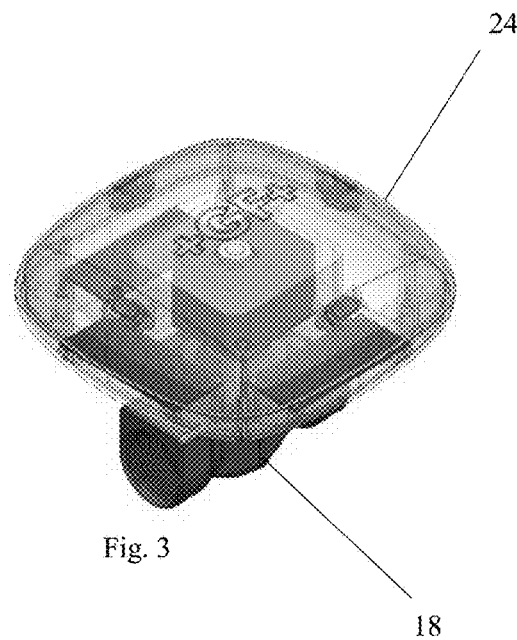
FIG. 3 is an isometric and partially transparent view of an exemplary compact module used with the smart valve gas shut-off system of FIG. 1
Figure 4:
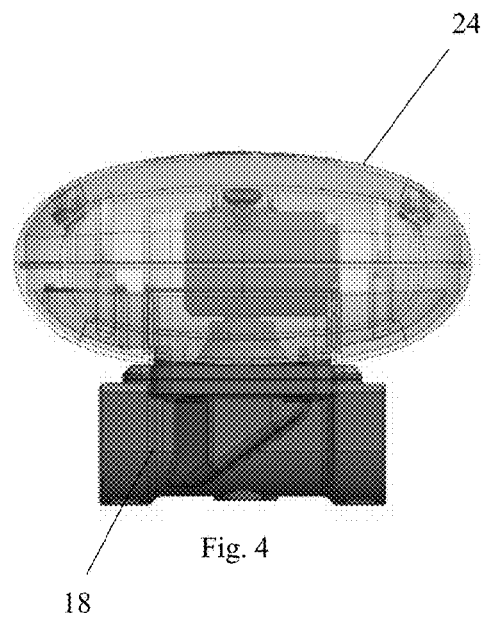
FIG. 4 is a side and partially transparent view of an exemplary compact module of FIG. 3.

In an alternative aspect the sensor 12 may be mounted to and operatively connected to the valve 18. In one embodiment, this mounting of the sensor to the valve forms a compact module 24, as illustrated in FIGS. 3 and 4. As the sensor 12 detects the presence of natural gas, the sensor can operatively close the valve.

In another aspect, the light indicator 16 may be used to provide visual confirmation that the valve 18 is closed. In this embodiment, once the sensor 12 detects the presence of natural gas and sends a signal to close the valve 18 thereby shutting off the supply of natural gas, the light indicator may change color, for example from blue to red, where the color red indicates that the valve 18 is in the closed position. In contrast, when the light indicator changes back from red to blue, for example, this indicates that the gas valve is now open and the supply of natural gas has resumed.

In an alternative aspect, one or more audio alarms may be used with the gas shut-off system. In use, upon the detection of the presence of gas by the sensors 12, the sensors may provide a signal to the one or more audio alarms which will provide an audio alert signal. The one or more audio alarms may be installed with the sensor 12 or may be located remote from the sensor 12.

The alarms may provide an audio alert signal indicating the presence of natural gas. In a further aspect, after gas is no longer detected by the sensors, the sensors may provide a signal to each of the audio alarms to discontinue the audio alert signal. In an aspect, the alert signals may be a remote signal to the property owner who may not be physically on the premises or in the building. In a further aspect, the alert signal may be sent to a utility company to notify it of the detection of natural gas. Other types of alert signals may be provided with the system 10, including communication signals to an occupant's mobile device or tablet or similar device.

Figure 7:
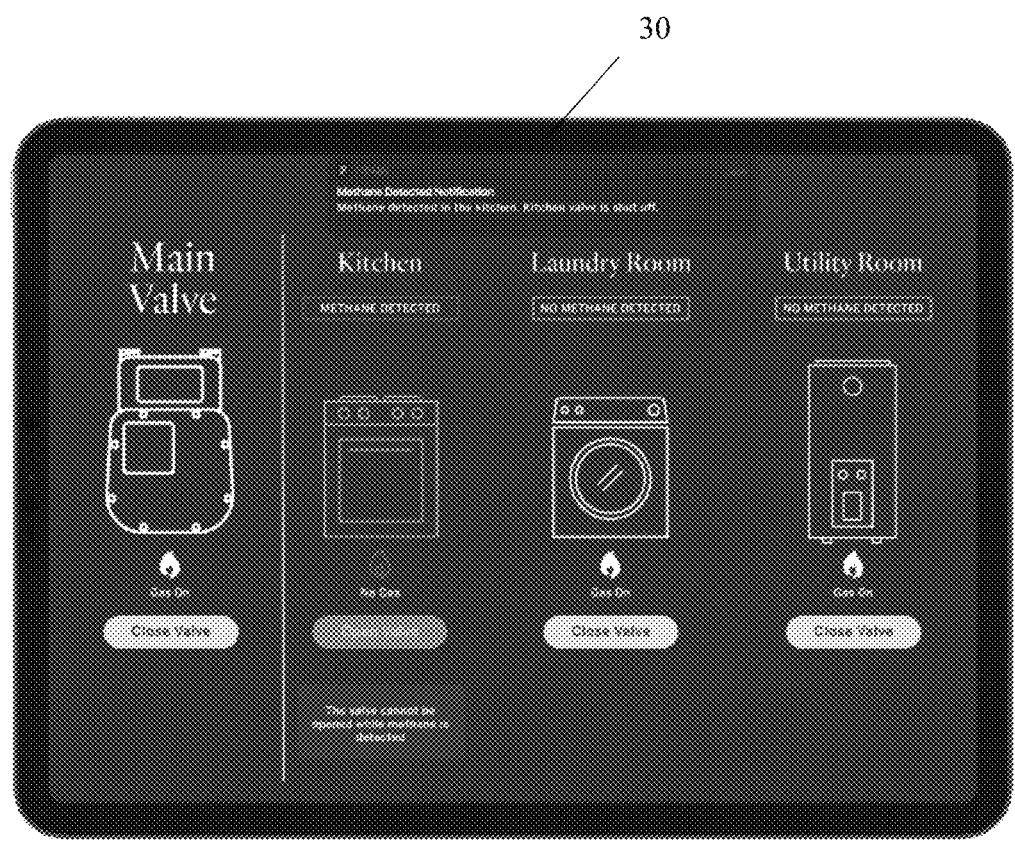
FIG. 7 is an exemplary user interface for use on a mobile device to control features of the smart valve gas shut-off system of FIG. 1.

Referring to FIG. 7, a mobile device or tablet may receive status information concerning all the sensors in a building. This status may be displayed in the form of a user interface 30. The user interface 30 may contain a listing or image of the sensor locations, for example, in the kitchen, laundry room or utility room. The user interface may display whether the gas valves leading to each of the appliances within those rooms are open or closed. The user interface may also display whether natural gas has been detected in any of the rooms.

The user interface 30 may also allow control by the user of the various gas supply valves within a building. For example, as depicted in FIG. 7, the user may elect to close the main valve leading to the building. Or the user may elect to close one or more other valves, such as the valves leading to the stove within a kitchen, or a dryer within a laundry room.

Upon closing the one or more valves remotely through the user interface, in one embodiment, the valves may not be reopened from the user interface, but only by manual operation of the valve. This will allow a person to physically inspect the area of the building first to confirm that there is no presence of natural gas before manually turning on the one or more valves.

In an aspect, while the sensor 12 is in the alarm state, meaning that it has detected the presence of natural gas, the valve reset button of the valve 18 is disabled and the valve 18 that controls the flow of gas cannot be opened. In a further aspect, once the sensor 12 returns to a normal state, meaning that it no longer detects the presence of natural gas, the valve rest button is enabled and the valve can then be reopened manually to allow the gas to re-flow, and the appliance to be relit, if desired.

In a further aspect, if two or more sensors 12 located within or around a building detect the presence of natural gas within a room or building, a full system alarm is set off and all valves 18 for all appliances are shut off, including the main valve that supplies natural gas to the building. The light indicators 16 will trigger indicating the presence of gas and therefore setting off an alarm. The light indicators 16 may also be used to indicate that all valves are shut off. In the alarm state, all valve reset buttons on all valves 18 are disabled, meaning all valves within the building and that separately control the flow of gas cannot be opened. Once all the sensors return to a normal state, meaning that none of them no longer detect the presence of natural gas, all valve reset buttons may be enabled and all gas valves may then be manually reopened to allow gas to re-flow to each appliance, and the appliances to be relit, if desired.

Figure 5:
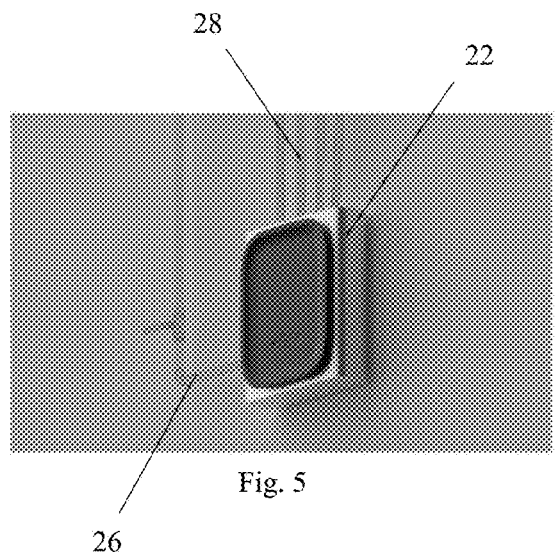
FIG. 5 is an isometric view of an exemplary main gas panel used with the smart valve gas shut-off system of FIG. 1

In another aspect, and illustrated by FIG. 5, a gas panel 22 may be installed within a building. The gas panel may be the gas equivalent to an electric panel used in most buildings. The gas panel may have a main natural gas line 26 supplied to it from an outside source. From the gas panel 22, one or more feed lines 28 may leave the panel and operatively connect to one or more appliances used within the building. The gas panel 22 may serve as a cabinet architecture where the outside supply line and individual feed lines can be monitored. Each of the supply and feed lines may include a shut-off valve that may be contained within the gas panel and may be controlled in the manner described herein. In an alternative aspect, multiple gas panels 22 may be used within a building and may be located at any desired location within the building.

Figure 6:
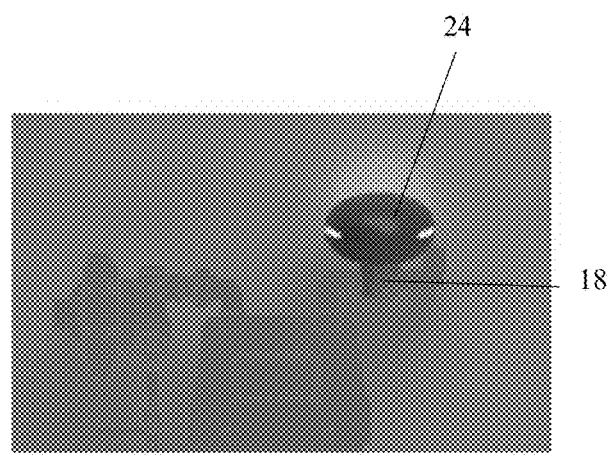
FIG. 6 is an isometric view of an exemplary compact module used with the smart valve gas shut-off system of FIG. 1

In yet a further aspect, and illustrated by FIGS. 3, 4, and 6, a compact control 24 module may be operatively connected to the main gas supply line to the building or may be operatively connected to each appliance within the building. In one embodiment, the control module combines the sensor 12 and valve 18. In an aspect, the control module 24 may control the shut off for the main supply line or the shut off for an appliance.

In an aspect, when a sensor located within the building detects the presence of natural gas within the building, the sensor may communicate with the control module 24 to shut off the gas supply line leading to the building. This will then stop the supply of natural gas to all appliances within or around the building. Effectively, the compact module 24 may be used to respond to a natural gas detection and alarm by shutting off everything downstream.

In an aspect, the sensor 12 may be used with both the gas panel 22 and the compact module 24, and may be used to communicate with the gas panel and compact module simultaneously or separately, as desired. In other words, the sensor 12 may control the shut-off valves associated with the gas panel and compact module at the same time, or may control each independently of the other.

In another aspect, the smart valve gas shut-off system upon detection of natural gas by one of the sensors 12 may control whether to shut off one valve, two valves, three valves, or all valves leading to the one or more appliances. Or the smart valve gas shut-off system can shut down the entire system, including the main gas supply line leading to the building. The smart valve gas shut-off system is configurable to control which valves 18 will be closed depending on which sensors 12 detect the presence of natural gas. For example, if a sensor 12 detects the presence of natural gas in a laundry room within a building, the system may be configured to shut off the supply of gas to each appliance within the laundry room and to any appliance in a neighboring room, but not to any appliance located in a location distant from the area where the natural gas was detected.

Various embodiments of a smart valve gas shut-off system have been described herein, which include various components and features. In other embodiments, the smart valve gas shut-off system may be provided with any combination of such components and features. It is also understood that in other embodiments, the various devices, components, and features of the smart valve gas shut-off system described herein may be constructed with similar structural and functional elements having different configurations, including different ornamental appearances.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims.

What is claimed is:

1. A gas shut-off system for a building comprising:
one or more sensors located within the building;
one or more light indicators in operative communication with the one or more sensors; and
one or more gas shut-off valves in operative communication with the one or more sensors, each of the one or more gas shut-off valves having a valve reset, wherein the one or more gas shut-off valves are operatively connected to one or more appliances within the building, and wherein the one or more gas shut-off valves define an open position and a close position;
wherein the one or more sensors further include an ambient sensor to detect the presence of gas in the building;
wherein upon the detection of the presence of gas by the one or more sensors, the sensors providing an operation signal to the one or more gas shut-off valves to move the one or more gas shut-off valves to the closed position and to provide an alert signal to the one or more light indicators; and
wherein after gas is no longer detected by the one or more sensors, the one or more sensors providing a valve reset signal to the valve reset on the one or more gas shut-off valves to make the one or more gas shut-off valves operable, the sensor signal provided to the valve reset before the one or more gas shut-off valves can be moved to the open position.

2. The gas shut-off system of claim 1, further comprising a gas panel located within the building.

3. The gas shut-off system of claim 2, wherein the gas panel may be operatively connected to a gas supply line to the building and one or more gas feed lines to the one or more gas shut-off valves.

4. The gas shut-off system of claim 1, further comprising a compact module operatively connected to at least one of the one or more gas shut-off valves, the compact module including a sensor for detecting the presence of gas.

5. The gas shut-off system of claim 1, wherein upon the detection of the presence of gas by more than one of the one or more sensors, the one or more sensors providing the operation signal to the one or more gas shut-off valves to move all of the valves of the one or more gas shut-off valves to the closed position.

6. The gas shut-off system of claim 5, wherein upon the detection of the presence of gas by more than one of the one or more sensors, the one or more sensors providing the alert signal to all of the one or more light indicators.

7. The gas shut-off system of claim 6, wherein after gas is no longer detected by the more than one of the one or more sensors, the sensors providing the valve reset signal to the valve reset on each of the one or more gas shut-off valves to thereby permit each of the one or more gas shut-off valves to be moved to the open position.

8. The gas shut-off system of claim 1, wherein the one or more light indicators provide one or more different colors to indicate the status of the one or more gas shut-off valves.

9. The gas shut-off system of claim 6, wherein the one or more light indicators provide one or more different colors to indicate the status of the one or more gas shut-off valves.

10. The gas shut-off system of claim 1, further comprising one or more audio alarms operatively connected to the one or more sensors.

11. The gas shut-off system of claim 10, wherein upon the detection of the presence of gas by the one or more sensors, the one or more sensors providing an audio alert signal to the one or more audio alarms, and wherein the one or more audio alarms provide an audio alert signal.

12. The gas shut-off system of claim 11, wherein after gas is no longer detected by the one or more sensors, the one or more sensors providing a second audio alert signal to each of the audio alarms, and wherein the one or more audio alarms discontinue the audio alert signal.

13. The gas shut-off system of claim 1, further comprising a main shut-off valve on a main gas supply line for the building.

14. The gas shut-off system of claim 13, wherein upon the detection of the presence of gas by more than one of the one or more sensors, the one or more sensors providing a main shut-off operation signal to the main shut-off valve to move the main shut-off valve to the closed position.

15. The gas shut-off system of claim 14, wherein after gas is no longer detected by the more than one of the one or more sensors, the one or more sensors providing a main valve reset signal to a valve reset on the main shut-off valve to thereby permit the main shut-off valve to be moved to the open position after receiving the main valve reset signal.

16. The gas shut-off system of claim 1, wherein the one or more sensors are located near the one or more appliances located within the building.

17. A gas shut-off system for use in a building, comprising:
one or more sensors located within the building, wherein the one or more sensors are located near one or more appliances within the building;
one or more light indicators in operative communication with the one or more sensors; and
one or more gas shut-off valves in operative communication with the one or more sensors, each of the one or more gas shut-off valves having a valve reset, wherein the one or more gas shut-off valves are operatively connected to the one or more appliances within the building, and wherein the one or more gas shut-off valves define an open position and a close position;
wherein the one or more sensors further include an ambient sensor to detect the presence of natural gas in the building;
wherein upon the detection of the presence of natural gas by the one or more sensors, the one or more sensors providing an operation signal to the one or more gas shut-off valves to move the one or more gas shut-off valves to the closed position and to provide an alert signal to the one or more light indicators, wherein the one or more light indicators indicate that the one or more gas shut-off valves are in the closed position; and
wherein after the natural gas is no longer detected by the one or more sensors, the one or more sensors providing a valve reset signal to the valve reset on the one or more gas shut-off valves to make the one or more gas shut-off valves operable, the valve reset signal provided to the valve reset before the one or more gas shut-off valves can be moved to the open position.

18. The gas shut-off system of claim 17, wherein upon the detection of the presence of gas by more than one of the one or more sensors, the one or more sensors providing the operation signal to the one or more gas shut-off valves to move all of the valves of the one or more gas shut-off valves to the closed position.

19. The gas shut-off system of claim 18, wherein upon the detection of the presence of gas by more than one of the one or more sensors, the one or more sensors providing the alert signal to all of the one or more light indicators, wherein the one or more light indicators indicate that all of the one or more gas shut-off valves are in the closed position.

20. The gas shut-off system of claim 19, wherein upon the detection of the presence of gas by more than one of the one or more sensors, the one or more sensors providing an audio alert signal to one or more audio alarms, and wherein the one or more audio alarms provide an audio alert signal.

* * * * *